(12) United States Patent
Kotake et al.

(10) Patent No.: US 10,006,683 B2
(45) Date of Patent: Jun. 26, 2018

(54) HEAT PUMP SYSTEM ENERGY MANAGEMENT DEVICE

(71) Applicant: DAIKIN INDUSTRIES, LTD., Osaka-shi, Osaka (JP)

(72) Inventors: Masato Kotake, Sakai (JP); Yi Zheng, Sakai (JP); Takahiro Yamaguchi, Sakai (JP)

(73) Assignee: Daikin Industries, Ltd., Osaka (JP)

( * ) Notice: Subject to any disclaimer, the term of this patent is extended or adjusted under 35 U.S.C. 154(b) by 518 days.

(21) Appl. No.: 14/379,632

(22) PCT Filed: Feb. 26, 2013

(86) PCT No.: PCT/JP2013/054854
§ 371 (c)(1),
(2) Date: Aug. 19, 2014

(87) PCT Pub. No.: WO2013/129353
PCT Pub. Date: Sep. 6, 2013

(65) Prior Publication Data
US 2015/0019023 A1    Jan. 15, 2015

(30) Foreign Application Priority Data

Feb. 27, 2012    (JP) .................................. 2012-040757

(51) Int. Cl.
*F25B 49/00* (2006.01)
*F25B 30/00* (2006.01)
(Continued)

(52) U.S. Cl.
CPC .............. *F25B 49/00* (2013.01); *F25B 30/00* (2013.01); *G05F 1/66* (2013.01); *G06N 99/005* (2013.01);
(Continued)

(58) Field of Classification Search
CPC ...... G25B 49/00; F25B 30/00; F25B 2600/00; F25B 49/00; G06N 99/005; G05F 1/66;
(Continued)

(56) References Cited

U.S. PATENT DOCUMENTS 8,406,933 B2 * 3/2013 Nagel ................... H04L 67/125
700/286
9,171,256 B2 * 10/2015 Mohagheghi ...... G06Q 30/0621
(Continued)

FOREIGN PATENT DOCUMENTS

| JP | 2005-273958 A | 10/2005 |
| JP | 2006-353079 A | 12/2006 |
| JP | 2008-295193 A | 12/2008 |

OTHER PUBLICATIONS

International Search Report of corresponding PCT Application No. PCT/JP2013/054854 dated Mar. 26, 2013.
(Continued)

*Primary Examiner* — Todd Aguilera
(74) *Attorney, Agent, or Firm* — Global IP Counselors, LLP

(57) ABSTRACT

A management device manages plural heat pump systems to bring a total amount of energy consumed by the heat pump systems closer to a target value. The management device includes a request transmitting unit, a consumption information receiving unit, a database, and a learning unit. The request transmitting unit transmits requested values of energy consumption to each of the heat pump systems. The consumption information receiving unit receives actual values of energy consumption from each of the heat pump systems. The database stores response characteristics of consumers having each of the heat pump systems with respect to the requested values of energy consumption. The learning unit learns the response characteristics and reflects learning results based on past records of responses of each
(Continued)

of the consumers with respect to the requested values of energy consumption in the database.

11 Claims, 10 Drawing Sheets

(51) Int. Cl.
  *G05F 1/66* (2006.01)
  *G06Q 10/06* (2012.01)
  *G06Q 50/06* (2012.01)
  *G06N 99/00* (2010.01)
  *H02J 3/14* (2006.01)

(52) U.S. Cl.
  CPC ............. *G06Q 10/06* (2013.01); *G06Q 50/06* (2013.01); *F25B 2600/00* (2013.01); *H02J 3/14* (2013.01); *H02J 2003/143* (2013.01); *Y02B 70/3225* (2013.01); *Y02B 70/3266* (2013.01); *Y02B 70/3275* (2013.01); *Y04S 20/222* (2013.01); *Y04S 20/242* (2013.01); *Y04S 20/244* (2013.01)

(58) Field of Classification Search
  CPC ... G06Q 50/06; G06Q 10/06; H02J 2003/143; H02J 3/14; G05B 13/04–13/048; G05B 2219/2614; G05B 2219/32201; G05B 17/02; F24F 2011/0058; F24F 2011/0075; F24F 11/085; Y02B 70/3225; Y02B 70/3275; Y02B 70/3266; Y04S 20/222–20/224; Y04S 20/244; Y04S 20/242; Y24F 11/085
  USPC ........ 700/28–31, 47, 48, 276–278, 286, 291
  See application file for complete search history.

(56) References Cited

U.S. PATENT DOCUMENTS

| | | |
|---|---|---|
| 2006/0106741 A1 | 5/2006 | Janarthanan |
| 2010/0145884 A1* | 6/2010 | Paik ..................... G06Q 50/06 705/412 |
| 2010/0332373 A1* | 12/2010 | Crabtree ............... G06Q 50/06 705/37 |
| 2011/0046792 A1 | 2/2011 | Imes et al. |
| 2011/0046806 A1* | 2/2011 | Nagel ................... H04L 67/125 700/291 |
| 2011/0196513 A1 | 8/2011 | Willig et al. |
| 2012/0065793 A1 | 3/2012 | Kaji |
| 2012/0078687 A1* | 3/2012 | Ghosh .................... G06Q 50/06 705/14.1 |
| 2013/0289785 A1* | 10/2013 | Takahashi ............. G06Q 50/06 700/286 |

OTHER PUBLICATIONS

European Search Report of corresponding EP Application No. 13 75 4639. 6 dated Oct. 9, 2015.

International Preliminary Report of corresponding PCT Application No. PCT/JP2013/054854 dated Sep. 12, 2014.

\* cited by examiner

| | CURRENT DAY | | FOLLOWING DAY |
| --- | --- | --- | --- |
| | PLANNED VALUE | ACTUAL VALUE | PLANNED VALUE |
| 0:00 | 1.0kW | 0.9kW | 0.4kW |
| 0:01 | 1.0kW | | 0.3kW |
| ... | ... | ... | ... |
| 17:00 | 4.5kW | | 0.7kW |
| ... | ... | ... | ... |
| 23:59 | 0.5kW | | 0kW |

| | CURRENT DAY | | FOLLOWING DAY |
| --- | --- | --- | --- |
| | PLANNED VALUE | ACTUAL VALUE | PLANNED VALUE |
| 0:00 | 0.5MW | 0.5MW | 0.5MW |
| 0:01 | 0.5MW | | 0.5MW |
| ... | ... | ... | ... |
| 17:00 | 1.0MW | | 0.7MW |
| ... | ... | ... | ... |
| 23:59 | 0.4MW | | 0.4MW |

FIG. 7

| | CURRENT DAY REQUESTED VALUE | FOLLOWING DAY REQUESTED VALUE |
|---|---|---|
| 0:00 | 0.5MW | 0.5MW |
| 0:01 | 0.7MW | 0.5MW |
| ... | ... | ... |
| 17:00 | 0.6MW | 0.7MW |
| ... | ... | ... |
| 23:59 | 0.4MW | 0.4MW |

FIG. 8

| ID: 323 | CURRENT DAY | | FOLLOWING DAY | |
|---|---|---|---|---|
| | REQUESTED VALUE | REWARD | REQUESTED VALUE | REWARD |
| 0:00 | NO INSTRUCTION | 0 | NO INSTRUCTION | 0 |
| 0:01 | LOWER LIMIT OF USE 25% | 0.5₲ | NO INSTRUCTION | 0 |
| ... | ... | ... | ... | ... |
| 17:00 | UPPER LIMIT OF USE 50% | 0.5₲ | NO INSTRUCTION | 0 |
| ... | ... | ... | ... | ... |
| 23:59 | NO INSTRUCTION | 0 | NO INSTRUCTION | 0 |

| | CURRENT DAY | | FOLLOWING DAY | |
|---|---|---|---|---|
| | OPERATION | OUTPUT | OPERATION | OUTPUT |
| 0:00 | | | ... | ... |
| 0:01 | WATER HEATING | 25% | ... | ... |
| ... | ... | ... | ... | ... |
| 17:00 | ROOM HEATING | 50% | ... | ... |
| ... | ... | ... | ... | ... |
| 23:59 | ... | ... | ... | ... |

HEAT PUMP SYSTEM ENERGY MANAGEMENT DEVICE

CROSS-REFERENCE TO RELATED APPLICATIONS

This U.S. National stage application claims priority under 35 U.S.C. § 119(a) to Japanese Patent Application No. 2012-040757, filed in Japan on Feb. 27, 2012, the entire contents of which are hereby incorporated herein by reference.

TECHNICAL FIELD

The present invention relates to a heat pump system energy management device.

BACKGROUND ART

Today, out of concern for the environment, there is a demand for the percentage occupied by natural energy to be increased.

However, natural energy is easily affected by weather changes. If wind power and solar power generation increases, the amount of power generated will increase or decrease depending on the weather. If the total amount of power generated and the total amount of power consumed are out of balance, the frequency of the electric power system fluctuates. If the frequency fluctuates, a disturbance will occur in the electric power system. In order to balance the total amount of power generated and the total amount of power consumed, there are methods of adjusting power supply, such as, for example, storing surplus power in a rechargeable battery and, when the amount of power generated is insufficient, using the power stored in the rechargeable battery to make up for the insufficient power. However, rechargeable batteries are still expensive, and deploying rechargeable batteries sufficient for adjustment is difficult. Thus, methods of adjusting power demand have been proposed. For example, in JP-A No. 2006-353079, there is proposed an electric power system stabilization system that controls, via a communication line, the power consumption of a plurality of specific loads connected to an electric power system to thereby balance the time series total amount of generated power and the time series total amount of consumed power and stabilize the frequency of the electric power system.

SUMMARY

Technical Problem

In this connection, the electric power system stabilization system described in JP-A No. 2006-353079 illustrates compressors of vending machines, river drainage pumps, or agricultural water pumps as the specific loads whose power consumption is to be controlled. However, stable supply and demand adjustments cannot be realized unless these loads adjust their power consumption as supposed. Furthermore, in seasons in which supply and demand balance of power is tightened, such as in summer and winter, it is important to adjust the power consumed by heat pump systems that many consumers have.

Thus, it is a problem of the present invention to provide, in relation to a management device that manages the energy consumption of heat pump systems of plural consumers, a management device that can realize stable supply and demand adjustments of energy.

Solution to Problem

A management device pertaining to a first aspect of the present invention is a management device that manages plural heat pump systems and brings a total amount of energy consumed by the heat pump systems closer to a target value. The management device comprises a request transmitting unit, a consumption information receiving unit, a database, and a learning unit. The request transmitting unit transmits requested values of energy consumption to each of the heat pump systems. The consumption information receiving unit receives actual values of energy consumption from each of the heat pump systems. The database stores response characteristics of consumers having each of the heat pump systems with respect to the requested values of energy consumption. The learning unit learns the response characteristics and reflects learning results based on past records of responses of each of the consumers with respect to the requested values of energy consumption in the database.

The management device pertaining to the first aspect of the present invention can predict how each of the heat pump systems will respond to requests to adjust energy consumption. Because of this, stable supply and demand adjustments can be realized in a management device that manages the energy consumption of heat pump systems of plural consumers.

The energy is, for example, electricity, and is expressed in units such as watts or watt-hours.

A management device pertaining to a second aspect of the present invention is the management device pertaining to the first aspect, wherein the learning unit learns the response characteristics by connecting the actual values of energy consumption with information relating to at least one of season, day of week, time period, and weather.

The management device pertaining to the second aspect uses the information such as season, day of week, time period, and weather and the past records as abase for learning the response characteristics. Because of this, highly reliable response characteristics can be obtained.

A management device pertaining to a third aspect of the present invention is the management device pertaining to the first aspect or the second aspect, wherein the learning unit learns the response characteristics being mathematical models.

In the management device pertaining to the third aspect, the response characteristics are expressed as mathematical models. Because of this, highly reliably response characteristics can be obtained.

A management device pertaining to a fourth aspect of the present invention is the management device pertaining to any of the first aspect to the third aspect, wherein the request transmitting unit transmits the requested values of energy consumption including information relating to incentives to each of the heat pump systems.

In the management device pertaining to the fourth aspect of the present invention, the requested values of energy consumption include incentives. Because of this, each of the consumers can be offered incentives for following the requested values of energy consumption.

A management device pertaining to a fifth aspect of the present invention is the management device pertaining to any of the first aspect to the fourth aspect and further comprises an energy consumption request receiving unit.

The energy consumption request receiving unit receives the requested values of energy consumption or energy pricing information from a higher-level energy management device.

The management device pertaining to the fifth aspect of the present invention obtains the requested values of energy consumption or the energy pricing information from the higher-level energy management device that an electric power company, for example, has. Because of this, the management device can fulfill the role of an aggregator which mediates between an electric power company and consumers for stable supply and demand adjustments of energy.

A management device pertaining to a sixth aspect of the present invention is the management device pertaining to any of the first aspect to the fifth aspect and further comprises an allocating unit. The allocating unit allocates the requested values of energy consumption to each of the heat pump systems on the basis of the response characteristics.

Because of this, highly reliable energy consumption adjustments can be performed.

Advantageous Effects of Invention

In the management device pertaining to the first aspect of the present invention, stable supply and demand adjustments can be realized by a management device that manages the energy consumption of heat pump systems of plural consumers.

In the management device pertaining to the second aspect and the third aspect of the present invention, highly reliable response characteristics can be obtained.

In the management device pertaining to the fourth aspect of the present invention, each of the consumers can be offered incentives for following the requested values of energy consumption.

The management device pertaining to the fifth aspect of the present invention can fulfill the role of an aggregator which mediates between an electric power company and consumers for stable supply and demand adjustments of energy.

In the management device pertaining to the sixth aspect of the present invention, highly reliable energy consumption adjustments can be performed.

BRIEF DESCRIPTION OF DRAWINGS

FIG. 5 is an example of an individual consumption plan;

FIG. 6 is an example of a total consumption plan;

FIG. 7 is an example of a total consumption request;

FIG. 8 is an example of an individual consumption request;

FIG. 9 is an example of an operation plan for the heat pump system;

DESCRIPTION OF EMBODIMENT

An embodiment of a management device pertaining to the present invention will be described below with reference to the drawings.

(1) Overall Configuration

Figure 1:
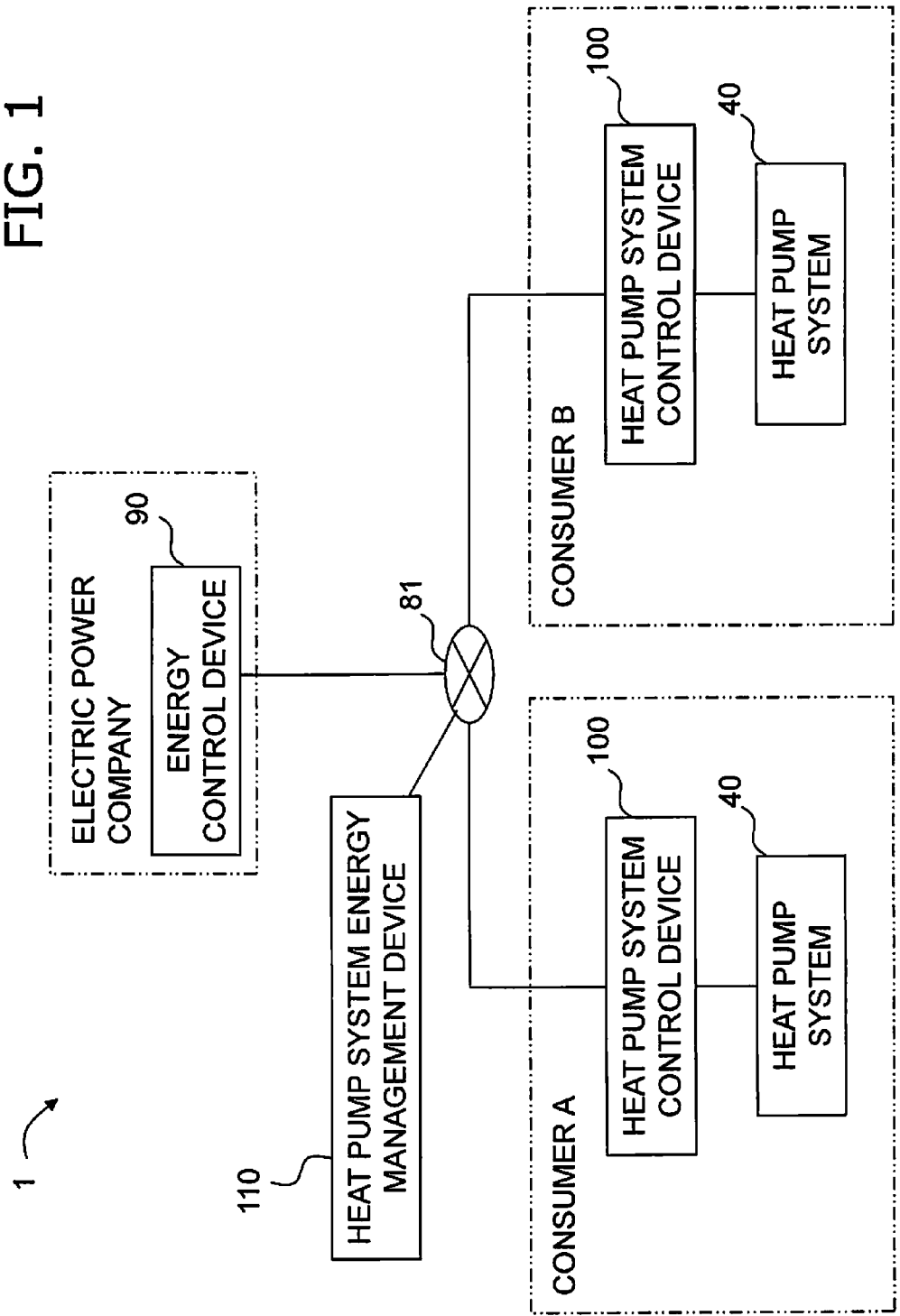
FIG. 1 is a schematic diagram of the configuration of an energy demand adjustment system.

FIG. 1 is a diagram schematically showing the configuration of an energy demand adjustment system 1 that includes a heat pump system energy management device 110 that is an example of the management device pertaining to the present invention.

The energy demand adjustment system 1 mainly has an energy control device 90, the heat pump system energy management device 110, plural heat pump system control devices 100, and plural heat pump systems 40. The energy control device 90, the heat pump system energy management device 110, and the heat pump system control devices 100 are interconnected by a communication line, that is, a communication network 81 such as the Internet. The heat pump system control devices 100 are devices provided to the heat pump systems 40 and function as control units that control the heat pump systems 40.

(2) Energy Control Device 90

The energy control device 90 is a device that an electric power company has and is a higher-level (superordinate) energy management device to the heat pump system energy management device 110. The energy control device 90 collects information relating to energy supply and demand in order to perform adjustments so that energy demand and supply in the energy system of the electric power company are balanced. During time periods in which energy demand is likely to exceed supply, the energy control device 90 requests consumers to curb energy consumption. Conversely, during time periods in which energy supply is likely to exceed demand, the energy control device 90 requests consumers to boost energy consumption. The energy control device 90 decides requests to the consumers regarding energy consumption as requested values of energy consumption by time period (e.g., every 1 minute). The energy control device 90 includes the requested values of energy consumption (the requested values in FIG. 7) in a total consumption request 123, which is data such as shown in FIG. 7, and transmits the total consumption request 123 to the heat pump system energy management device 110.

(3) Heat Pump System Energy Management Device 110

The heat pump system energy management device 110 is a management device that manages the plural heat pump systems 40 to bring the total amount of energy consumed by the plural heat pump systems 40 closer to the requested values in the total consumption request 123 that are target values. The heat pump system energy management device 110 is a server computer that a business operator called an aggregator has. The aggregator is a business operator who assembles plural consumers and mediates between the consumers and the electric power company for energy consumption adjustments on behalf of the consumers.

The heat pump system energy management device 110 receives the total consumption request 123 from the energy control device 90 of the electric power company and decides, as requested values of energy consumption, amounts of energy by time period to be consumed by the heat pump systems 40 that each of the consumers has on the basis of the requested values of energy consumption by time period (e.g., every 1 minute) included in the total consumption request 123. The heat pump system energy management device 110 includes the requested values of energy consumption in individual consumption requests 124 and transmits the individual consumption requests 124 to each of the heat pump systems 40, that is, the heat pump system control devices 100. As shown in FIG. 8, the individual consumption requests 124 are data including information relating to IDs (identification information) of each of the heat pump systems 40, requested values by time period, and monetary rewards or monetary penalties serving as incentives.

Furthermore, the heat pump system energy management device 110 receives, from each of the heat pump system control devices 100, planned values of energy consumption by time period (e.g., every 1 minute) of each of the heat pump systems 40 and actual values of energy consumption by time period that each of the heat pump systems 40 has actually consumed.

Moreover, the heat pump system energy management device 110 tallies the planned values and the actual values of energy consumption of each of the heat pump systems 40, which the heat pump system energy management device 110 has received, and transmits the tallied values to the energy control device 90.

Figure 2:
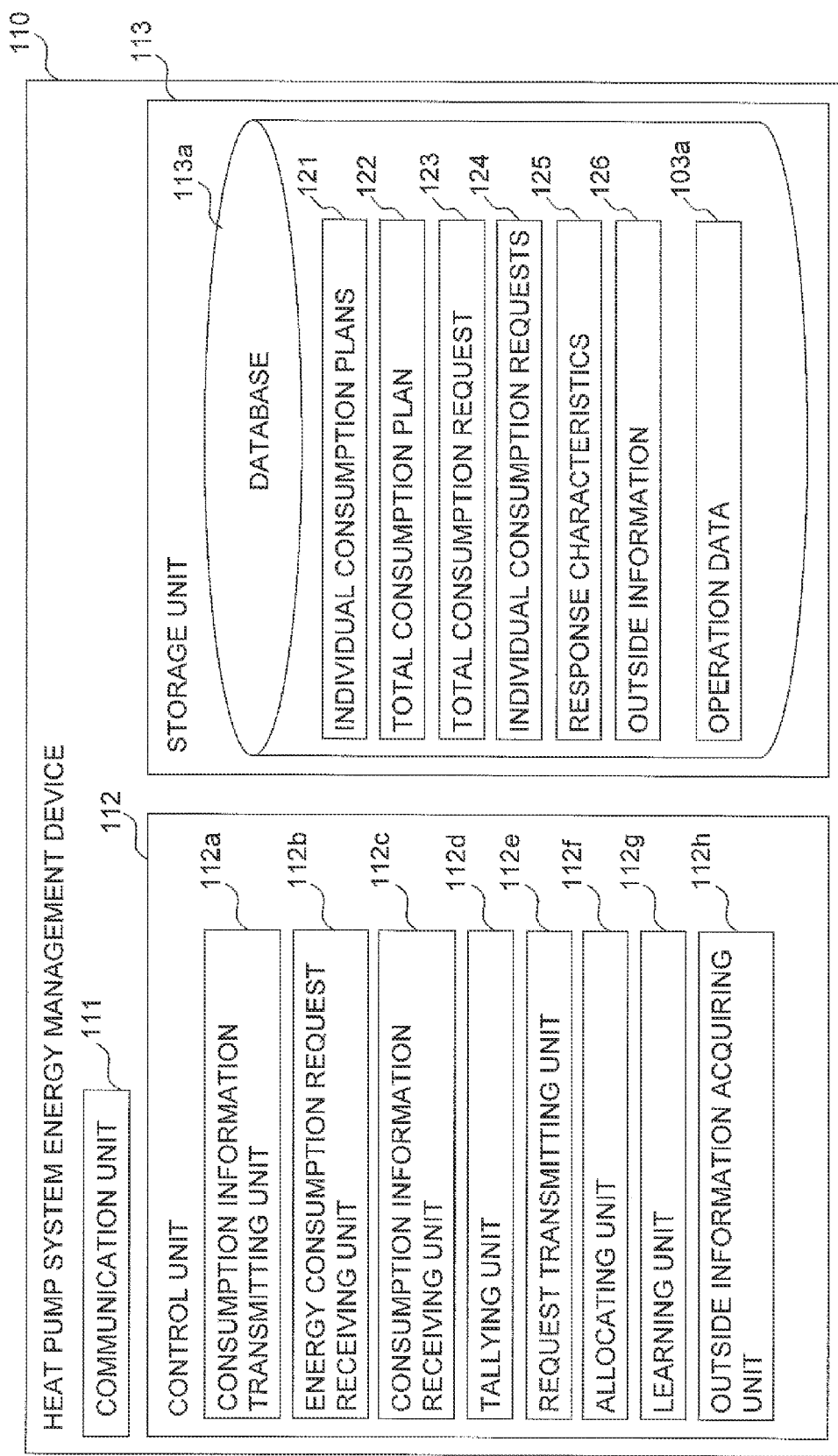
FIG. 2 is a block diagram of the configuration of a heat pump system energy management device pertaining to the present invention.

FIG. 2 is a schematic configuration diagram of the heat pump system energy management device 110. The heat pump system energy management device 110 mainly has a communication unit 111, a control unit 112, and a storage unit 113.

(3-1) Communication Unit

The communication unit 111 is an interface that makes the heat pump system energy management device 110 connectable to the communication network 81 using Ethernet (registered trademark; same below), for example.

(3-2) Storage Unit 113

The storage unit 113 mainly comprises a RAM, a ROM, and a hard disk. In the storage unit 113, a database 113a that accumulates and stores individual consumption plans 121, a total consumption plan 122, the individual consumption requests 124, the total consumption request 123, response characteristics 125, outside information 126, and operation data 103a of each of the heat pump systems 40 is constructed. Furthermore, other kinds of information, such as a program for the heat pump system energy management device 110, are also stored in the storage unit 113.

(3-3) Control Unit 112

The control unit 112 mainly comprises a CPU and executes the program for the heat pump system energy management device 110 stored in the storage unit 113. The control unit 112 mainly comprises a consumption information transmitting unit 112a, an energy consumption request receiving unit 112b, a consumption information receiving unit 112c, a tallying unit 112d, a request transmitting unit 112e, an allocating unit 112f, a learning unit 112g, and an outside information acquiring unit 112h by executing the program for the heat pump system energy management device 110.

(3-3-1) Consumption Information Transmitting Unit 112a

The consumption information transmitting unit 112a transmits to the higher-level energy control device 90 demand side provided information that is the planned values and the actual values of energy consumption by time period (e.g., every 1 minute) of the heat pump systems 40. Specifically, the demand side provided information is transmitted to the energy control device 90 as the total consumption plan 122 such as shown in FIG. 6. The total consumption plan 122 is a plan in which the planned values and the actual values of energy consumption by time period (e.g., every 1 minute) of each of the heat pump systems 40, included in the individual consumption plans 121 such as shown in FIG. 5, are tallied. The consumption information transmitting unit 112a transmits the total consumption plan 122 to the energy control device 90 via the communication unit 111, for example, once a day.

(3-3-2) Energy Consumption Request Receiving Unit 112b

The energy consumption request receiving unit 112b receives supply side provided information that is information relating to the requested values of energy consumption from the higher-level energy control device 90. Specifically, the supply side provided information is transmitted at predetermined intervals (e.g., 10 minutes) from the energy control device 90 as the total consumption request 123 such as shown in FIG. 7. The total consumption request 123 is data including the requested values of energy consumption (the requested values in FIG. 7) by time period (e.g., every 1 minute). The energy consumption request receiving unit 112b receives the total consumption request 123 via the communication unit 111 and stores it in the storage unit 113.

(3-3-3) Consumption Information Receiving Unit 112c

The consumption information receiving unit 112c collects demand side provided information from the heat pump systems 40. Specifically, the demand side provided information is transmitted from each of the heat pump systems 40 as the individual consumption plan 121 such as shown in FIG. 5. The individual consumption plans 121 are data including the IDs (identification information) of the heat pump systems 40 and the planned values and the actual values of energy consumption by time period (e.g., every 1 minute).

Furthermore, the consumption information receiving unit 112c receives the later-described operation data 103a from each of the heat pump systems 40 via the communication unit 111.

The consumption information receiving unit 112c receives the individual consumption plans 121 and the operation data 103a from each of the heat pump systems 40 via the communication unit 111 at predetermined intervals (e.g., 3 hours) and accumulates the individual consumption plans 121 and the operation data 103a via a DBMS in the database 113a of the storage unit 113.

(3-3-4) Tallying Unit 112d

The tallying unit 112d tallies the demand side provided information from each of the heat pump systems 40. Specifically, the tallying unit 112d tallies the individual consumption plans 121 stored in the storage unit 113 and stores the tallied results as the total consumption plan 122 in the database 113a.

(3-3-5) Request Transmitting Unit 112e

The request transmitting unit 112e transmits energy consumption requests (the individual consumption requests 124) that are requests relating to energy consumption to each of the heat pump systems 40 at predetermined intervals (e.g., 10 minutes) based on the total consumption request 123 that is the supply side provided information. As shown in FIG. 8, the individual consumption requests 124 are data including the IDs (identification information) of each of the heat pump systems 40, requested values by time period, and monetary rewards or monetary penalties serving as incentives. The requested values are, as shown in FIG. 8 for example, information in which a percentage to the rated capacity of the heat pump system 40 is set as an upper limit or a lower limit. The monetary rewards or monetary penalties are rewards or penalties that the business operator operating the heat pump system energy management device 110 allocates to each of the heat pump systems 40 as incentives in accordance with the requested values on the basis of monetary amounts agreed in a contract between the electric power company and the business operator.

(3-3-6) Allocating Unit 112*f*

The allocating unit 112*f* allocates energy consumption adjustment amounts and incentives to each of the heat pump systems 40. Specifically, the allocating unit 112*f* allocates energy consumption adjustment amounts to each of the heat pump systems 40 in such a way that the energy consumption amounts of all the heat pump systems 40 under management become the requested values of energy consumption (the requested values in FIG. 7) included in the total consumption request 123, and the allocating unit 112*f* stores the energy consumption adjustment amounts as the individual consumption requests 124 in the database 113*a*. Furthermore, the allocating unit 112*f* also allocates monetary rewards and monetary penalties as incentives for following the energy consumption adjustments to each of the heat pump systems 40 and includes the monetary rewards and monetary penalties in the individual consumption requests 124. The allocating unit 112*f* allocates the adjustment amounts and the incentives on the basis of the response characteristics 125 with respect to the requested values of energy consumption (the requested values in the individual consumption requests 124) of each of the heat pump systems 40. Allocation processing will be described in detail later.

(3-3-7) Learning Unit 112*g*

Figure 12:
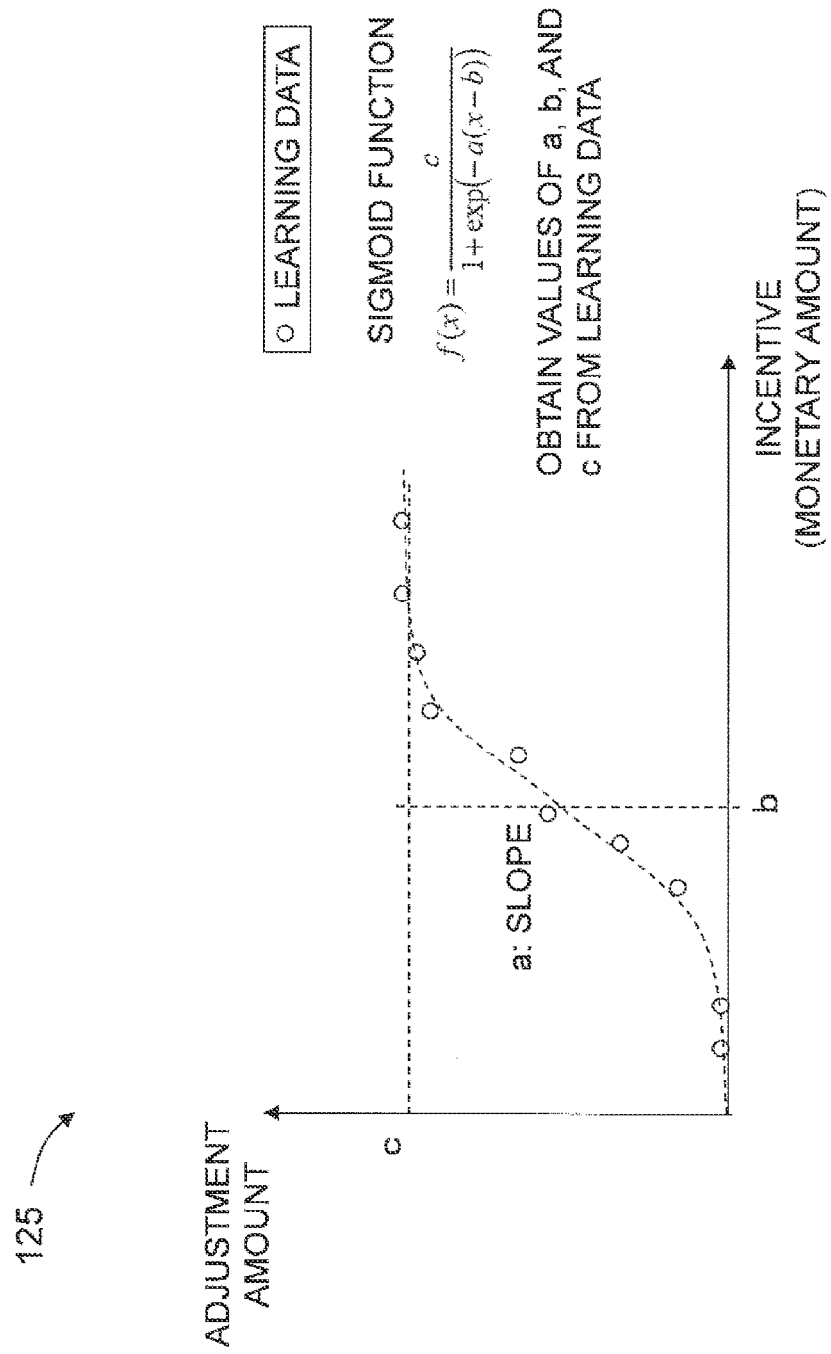
FIG. 12 is an example of a mathematical model of a response characteristic.

The learning unit 112*g* learns the response characteristics 125 and reflects the learning results based on past records of responses of each of the consumers to the requested values of energy consumption on the database 113*a*. Specifically, the learning unit 112*g* learns the response characteristics 125 by machine learning, for example, by connecting the actual values of energy consumption with information relating to at least one of season, day of week, time period, and weather. The response characteristics 125 are correlations between the actual values of the energy consumption adjustment amounts and the amounts of the monetary rewards or the amounts of the monetary penalties that are given as incentives. The response characteristics 125 are mathematical models and are, for example, expressed as a sigmoid function having a curve such as shown in FIG. 12.

(3-3-8) Outside Information Acquiring Unit 112*h*

The outside information acquiring unit 112*h* acquires outside information that is information relating to weather, temperature, and humidity and so on by time period (e.g., every 1 minute).

(4) Heat Pump Systems 40

(4-1) Overall Configuration of Heat Pump Systems 40

Figure 3:
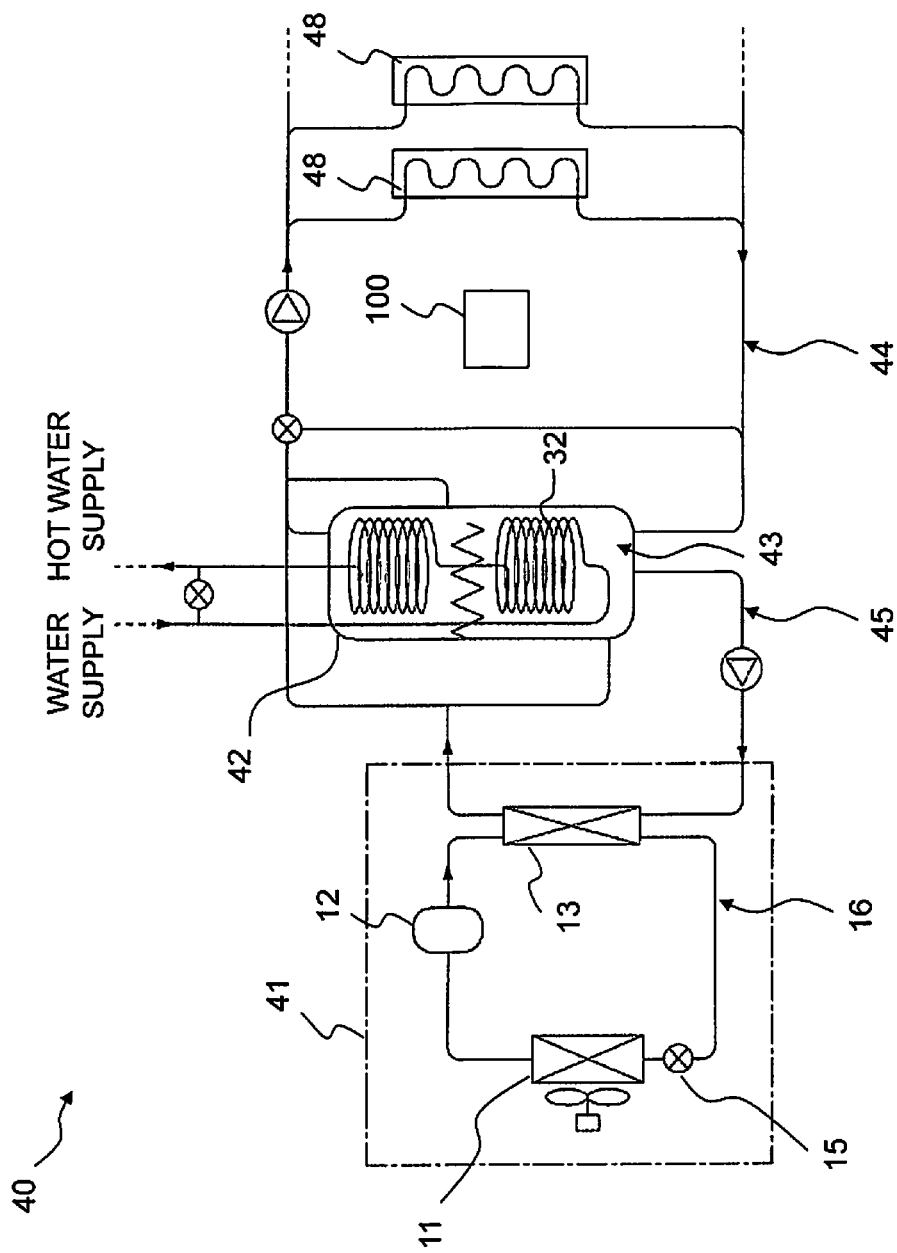
FIG. 3 is a schematic diagram of the configuration of a heat pump system pertaining to the present invention.

FIG. 3 is a diagram schematically showing the configuration of the heat pump systems 40.

In the present embodiment, the heat pump systems 40 are room heating and hot water supplying systems and are capable of heating living spaces and supplying hot water. Each of the heat pump systems 40 is equipped with a heat pump unit 41, a hot water storage tank 42, a hot water supply pipe 43, a room heating circulation circuit 44, and the heat pump system control device 100.

The heat pump unit 41 has a refrigerant circuit 16 and heats water sent from the hot water storage tank 42 and then turns the water into hot water. The refrigerant circuit 16 is mainly configured by sequentially connecting a compressor 12, a water heat exchanger 13 serving as a radiator, an electrically powered expansion valve 15 serving as an expansion mechanism, and an evaporator 11. The water heat exchanger 13 is a heat exchanger that functions as a refrigerant condenser.

The hot water storage tank 42 stores the hot water that has been heated by the heat pump unit 41. Inside the hot water storage tank 42, plural sensors not shown in the drawings are juxtaposed vertically, and these sensors sense the temperature of the hot water inside the hot water storage tank and transmit temperature information to the heat pump system control device 100. The hot water storage tank 42 is connected to the heat pump unit 41 via a water heating circulation circuit 45. The water heating circulation circuit 45 allows the relatively low-temperature hot water in the lower portion of the hot water storage tank 42 to pass through the water heat exchanger 13 and returns the hot water to the hot water storage tank 42.

The hot water supply pipe 43 branches from a water supply pipe, which supplies water, and incorporates into a hot water supply heat exchanger 32 disposed inside the hot water storage tank 42. The hot water supply pipe 43 is a pipe that allows tap water supplied from the water supply pipe to exchange heat with the hot water inside the hot water storage tank 42 at the hot water supply heat exchanger 32 and supplies hot water to a kitchen, bathtub, shower, and so forth at home.

The room heating circulation circuit 44 circulates the hot water stored inside the hot water storage tank 42 by causing the hot water to pass through plural radiators 48 installed in living spaces in a building as room radiators that are one of heat utilizing means and then to return the hot water to the hot water storage tank 42 to thereby utilize the plural radiators 48 as heating appliances inside the living spaces.

The heat pump system control device 100 controls the components of the heat pump system 40, such as the compressor 12. For example, when the temperature of the hot water inside the hot water storage tank 42 falls below a predetermined tower limit, the heat pump system control device 100 initiates a water heating operation and continues until the temperature of the hot water rises to a predetermined temperature. In the water heating operation, the heat pump system control device 100 causes the hot water inside the hot water storage tank 42 to flow to the heat pump unit 41 via the water heating circulation circuit 45, causes the hot water to pass through the water heat exchanger 13 to heat the hot water, and returns the hot water to the hot water storage tank 42. Furthermore, a control unit 47 controls the components of the heat pump system 40 on the basis of a later-described operation plan 103*b*. The operation plan 103*b* is input and set from a remote controller 130 by a user and is also created by the learning of the daily operation data 103*a* of the heat pump system 40 by the heat pump system control device 100. Furthermore, the heat pump system control device 100 controls the components of the heat pump system 40 in accordance with operations made via the remote controller 130 by the user.

(4-2) Detailed Configuration of Heat Pump System Control Devices 100

Figure 4:
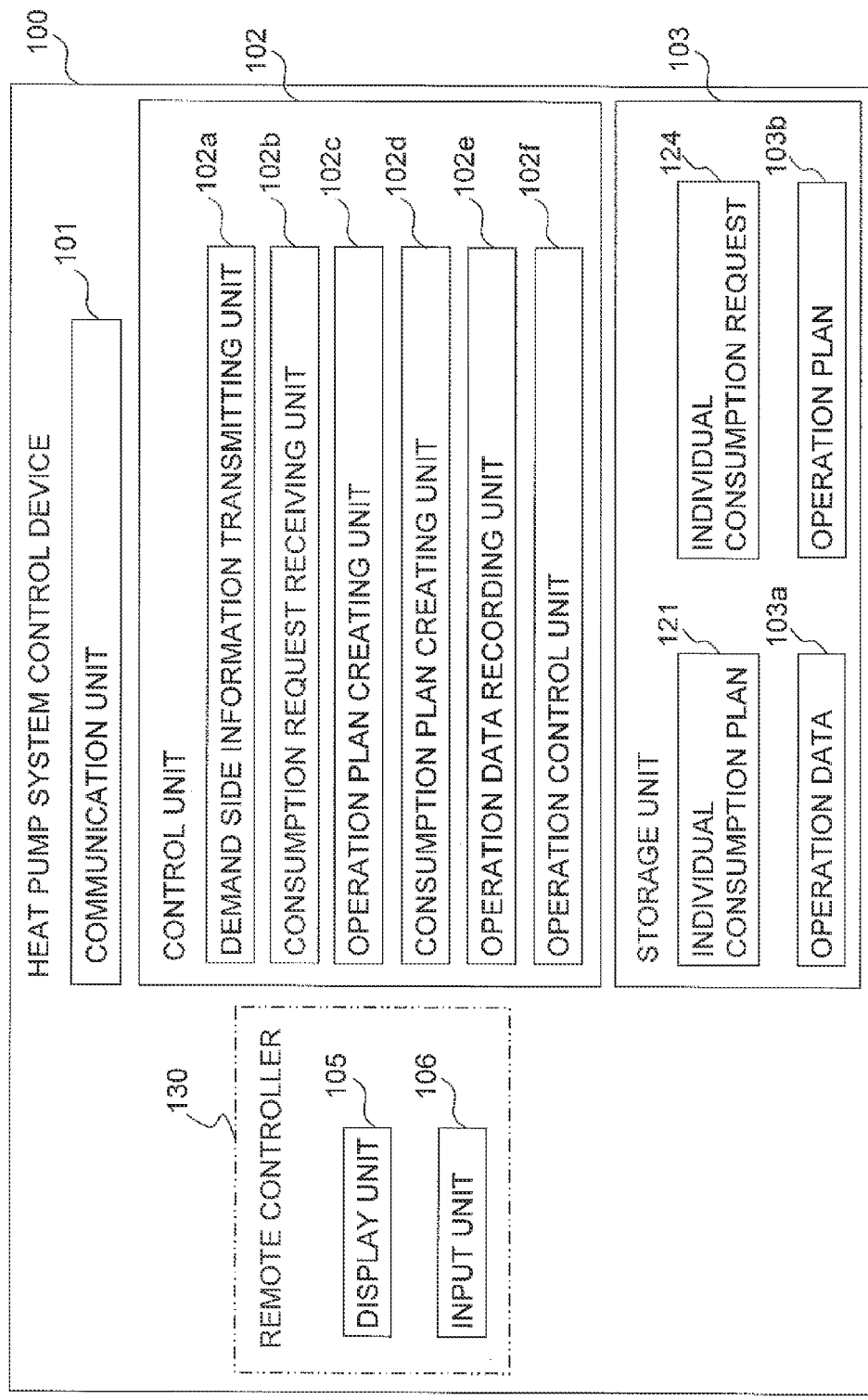
FIG. 4 is a block diagram of the configuration of a heat pump system control device.

FIG. 4 is a block diagram of the configuration of the heat pump system control devices 100.

Each of the heat pump system control devices 100 mainly comprises a communication unit 101, a control unit 102, a storage unit 103, a display unit 105, and an input unit 106.

The communication unit 101 is an interface with the communication network 81 such as Ethernet.

The control unit 102 comprises a CPU and executes a program for out pump system control device 100.

The storage unit 103 comprises a storage device such as a ROM, a RAM, and a hard disk and stores the program for the heat pump system control device 100, the operation data 103a, the operation plan 103b, the individual consumption plan 121, and the individual consumption request 124.

The display unit 105 and the input unit 106 are disposed in and provided by the remote controller 130. The display unit 105 is a touch panel liquid crystal screen. Consequently, the liquid crystal screen also functions as the input unit 106. In addition, the remote controller 130 is also equipped with buttons for operation, and the buttons also function as the input unit 106.

The control unit 102 mainly comprises a demand side information transmitting unit 102a, a consumption request receiving unit 102b, an operation plan creating unit 102c, a consumption plan creating unit 102d, an operation data recording unit 102e, and an operation control unit 102f by executing the program for the heat pump system control device 100.

(4-2-1) Demand Side Information Transmitting Unit 102a

The demand side information transmitting unit 102a transmits the planned values of energy consumption and the actual values of energy consumption of the heat pump system 40 to the heat pump system energy management device 110. Specifically, the demand side information transmitting unit 102a transmits the individual consumption plan 121, which is data stored in the storage unit 103, via the communication unit 101 to the heat pump system energy management device 110. The individual consumption plan 121 includes the planned values of energy consumption by time period (e.g., every 1 minute) of the current day and the following day as shown in FIG. 5, for example. Furthermore, the individual consumption plan 121 also includes the actual values of energy consumption by time period (e.g., every 1 minute) for time which has already elapsed.

Furthermore, the demand side information transmitting unit 102a transmits the operation data 103a via the communication unit 101 to the heat pump system energy management device 110.

The demand side information transmitting unit 102a transmits the above-described data to the heat pump system energy management device 110 at predetermined intervals (e.g., 3 hours).

(4-2-2) Consumption Request Receiving Unit 102b

The consumption request receiving unit 102b receives the individual consumption request 124 from the heat pump system energy management device 110 via the communication unit 101. Specifically, the consumption request receiving unit 102b receives the individual consumption request 124 via the communication unit 101. The consumption request receiving unit 102b stores the received individual consumption request 124 in the storage unit 103. The consumption request receiving unit 102b receives the individual consumption request 124 from the heat pump system energy management device 110 at predetermined intervals (e.g., 10 minutes). When it receives the individual consumption request 124, the consumption request receiving unit 102b commands the operation plan creating unit 102c to create or recreate the operation plan 103b.

(4-2-3) Operation Plan Creating Unit 102c

The operation plan creating unit 102c creates the operation plan 103b of the heat pump system 40 by time period (e.g., every 1 minute).

Specifically, for example, in a case where a schedule set by the user exists, the operation plan creating unit 102c creates the operation plan 103b based on that schedule.

In a case where operation data 103a are stored, the operation plan creating unit 102c learns the operation data 103a and creates the operation plan 103b based on the learning result. The operation plan creating unit 102c performs the learning, for example, by calculating operations with the highest probability by time period.

In a case where both a schedule and operation data 103a exist, the operation plan creating unit 102c creates the operation plan 103b based on the schedule and the result of learning the operation data 103a.

In a case where neither a schedule nor operation data 103a exists, the operation plan creating unit 102c uses an initially set plan as the operation plan 103b.

In any case, the operation plan creating unit 102c creates the operation plan 103b in such a way as to consume energy preferably during times when unit energy costs are relatively low, such as at night, for example.

Or, in a case where the individual consumption request 124 is stored in the storage unit 103, the operation plan creating unit 102c refers to the individual consumption request 124 and creates the operation plan 103b in such a way as to follow the individual consumption request 124. For example, as shown in FIG. 9, during a time period (0:01) in which the lower limit of use is set at 25% of the rating, the operation plan 103b calls for an output of 25%, that is, the compressor 12 is operated at a rotation speed equal to or greater than the rating of 25% to generate hot water, and the surplus energy in the electric power system is stored as heat. During a time period (17:00) in which the upper limit of use is set at 50% of the rating, the operation plan 103b calls for room heating to be performed at an output equal to or less than 50%, that is, it is ensured that the compressor 12 is not operated at a rotation speed exceeding 50% of the rating.

The operation plan 103b is stored in the storage unit 103.

(4-2-4) Consumption Plan Creating Unit 102d

The consumption plan creating unit 102d creates the individual consumption plan 121 based on the operation plan 103b. That is, the consumption plan creating unit 102d converts the operation plan 103b into the individual consumption plan 121. Specifically, data relating to the rated energy consumption amount of the heat pump system 40 are stored in the storage unit 103. The consumption plan creating unit 102d refers to the data, calculates amounts of energy to be consumed by time period (e.g., every 1 minute) based on the operation plan 103b, and stores the amounts in the storage unit 103 as the individual consumption plan 121.

(4-2-5) Operation Data Recording Unit 102e

The operation data recording unit 102e stores information relating to the operating statuses of each of the components of the heat pump system 40, such as the rotation speed of the compressor 12 by time period (e.g., every 1 minute) and operation instructions from the user, as the operation data 103a in the storage unit 103. Furthermore, the operation data recording unit 102e includes actual values of energy consumption by time period (e.g., every 1 minute), that is, the actual values of energy consumption, in the individual consumption plan 121 and stores the actual values in the storage unit 103.

(4-2-6) Operation Control Unit 102f

The operation control unit 102f controls the heat pump system 40 in accordance with the operation plan 103b. Furthermore, the operation control unit 102f controls the heat pump system 40 in accordance with instructions from the user that are input via the remote controller 130.

(5) Operations (5-1) Overall Operations

Figure 10:
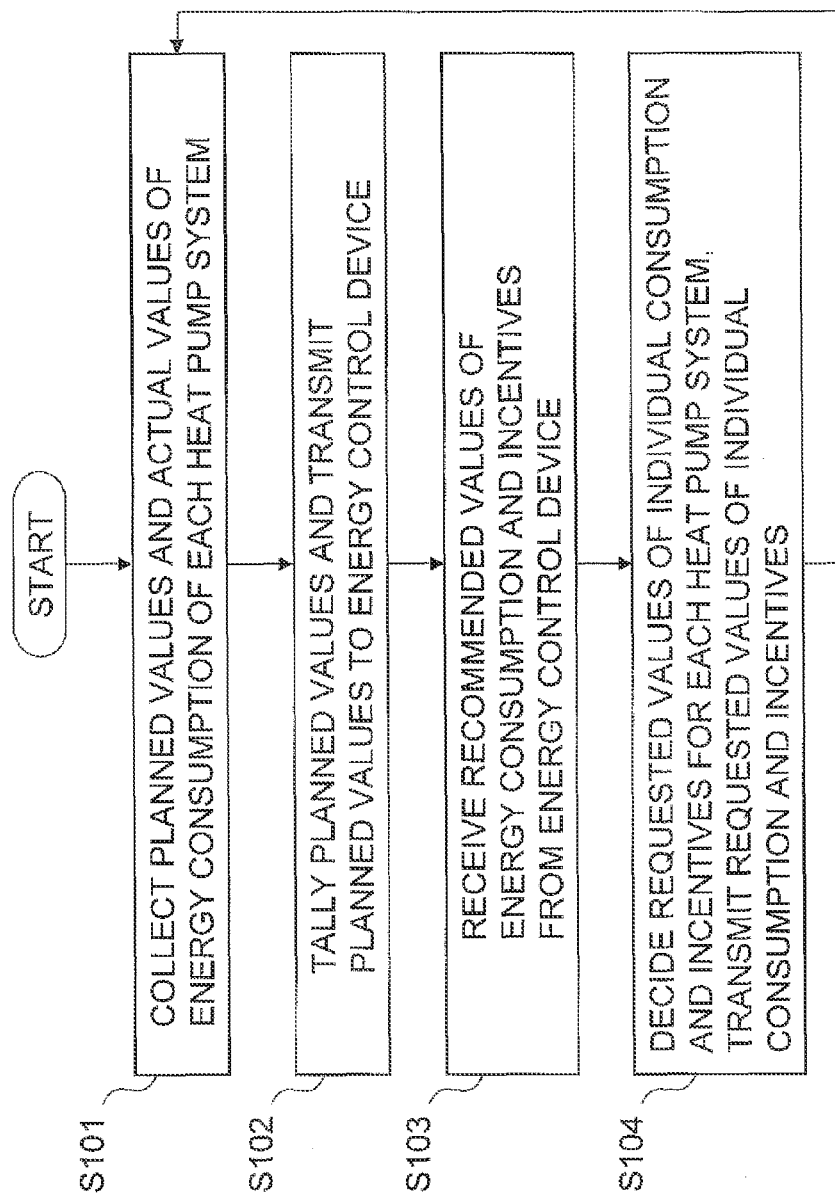
FIG. 10 is a processing flowchart of overall operation.

FIG. 10 is a flowchart showing the overall operations of the above-described energy demand adjustment system 1 from the standpoint of the heat pump system energy management device 110.

In a step S101, the heat pump system energy management device 110 collects the planned values and the actual values of energy consumption from each of the heat pump systems 40. Specifically, the consumption information receiving unit 112c receives, via the communication unit 111, the individual consumption plans 121 transmitted from each of the heat pump systems 40. Furthermore, the consumption information receiving unit 112c also receives, via the communication unit 111, the operation data 103a transmitted from each of the heat pump systems 40. The individual consumption plans 121 and the operation data 103a are accumulated in the database 113a.

In a next step S102, the heat pump system energy management device 110 tallies the planned values of energy consumption of each of the heat pump systems 40 and transmits the tallied values to the energy control device 90. Specifically, the tallying unit 112d tallies the planned values and the actual values of energy consumption included in the individual consumption plans 121 of each of the heat pump systems 40 in the storage unit 113 and stores the tallied results as the total consumption plan 122 in the storage unit 113. The consumption information transmitting unit 112a transmits the total consumption plan 122 to the energy control device 90 via the communication unit 111.

In a next step S103, the heat pump system energy management device 110 receives, from the energy control device 90, the requested values of energy consumption as target values of amounts of energy to be consumed. Specifically, when information relating to the requested values of energy consumption is transmitted as the total consumption request 123 from the energy control device 90, the energy consumption request receiving unit 112b receives the total consumption request 123 via the communication unit 111 and stores the total consumption request 123 in the storage unit 113. The total consumption request 123 includes the requested values of energy consumption by time period (e.g., every 1 minute). The total consumption request 123 is, for example, data such as shown in FIG. 7. For example, during the time period of 0:01, the requested value in the total consumption request 123 is larger than the planned value in the total consumption plan 122 shown in FIG. 6, so the increase of consumption is requested. During the time period of 17:00, the requested value in the total consumption request 123 is smaller than the planned value in the total consumption plan 122, so decrease of consumption is requested.

In a next step S104, the heat pump system energy management device 110 decides the energy consumption adjustment amounts and the monetary rewards or monetary penalties as incentives for each of the heat pump systems 40 and transmits the adjustment amounts and the incentives to each of the heat pump systems 40. Specifically, the request transmitting unit 112e allocates the energy consumption adjustment amounts and the incentives to each of the heat pump systems 40. The energy consumption adjustment amounts are determined in such a way that the overall energy consumption becomes equal to the requested values of energy consumption included in the total consumption request 123. The incentives are monetary rewards or monetary penalties agreed beforehand with the electric power company. The energy consumption adjustment amounts and the incentives are allocated on the basis of each of the heat pump systems 40, that is, on the basis of the response characteristics 125 of each of the consumers. The allocated adjustment amounts and incentives are transmitted via the communication unit 111 to each of the heat pump systems 40 as the individual consumption requests 124. The transmitted individual consumption requests 124 are, for example, data such as shown in FIG. 8. For example, during the time period of 0:01, the requested value in the total consumption request 123 is larger than the planned value in the total consumption plan 122, so in order to boost consumption, the lower limit of use is set equal to or greater than 25% of the rated capacity of the heat pump system 40, and the reward is set to 0.5 pounds as an incentive. During the time period of 17:00, the requested value in the total consumption request 123 is smaller than the planned value in the total consumption plan 122, so in order to curb consumption, the upper limit of use is set equal to or less than 50% of the rated capacity of the heat pump system 40, and the reward is set to 0.5 pounds as an incentive.

Thereafter, the flow returns to the step S101.

(5-2) Details of Allocation Processing

Next, an example of allocation processing, which allocates the energy consumption adjustment amounts and the monetary rewards and monetary penalties that are incentives, will be described below.

The allocating unit 112f allocates the adjustment amounts and the incentives as described below using a curve (hereinafter called a response curve) representing the response characteristics of the heat pump systems 40 of each of the consumers such as shown in FIG. 12, for example. The response curve in FIG. 12 is a sigmoid function given by equation 1 below. That is, the characteristics in which the heat pump systems 40 of each of the consumers respond to the adjustments with respect to the rewards are expressed as mathematical models. The response curve is prepared for each of patterns, such as, for example, days of week such as weekdays and weekend, time periods such as morning, daytime, and night, weather, temperature, humidity, and season, and the response curve of the pattern most suited for the current day is used.

$$f(x) = \frac{c}{1 + \exp(-a(x-b))} \quad \text{[Equation 1]}$$

Here, among the coefficients "a", "b", and "c" in the function, "a" denotes gain, "b" denotes the value of the reward at the point where the vertical dotted line in FIG. 12 intersects the horizontal axis, and "c" denotes the value of the adjustment amount at the point where the horizontal dotted line in FIG. 12 intersects the vertical axis.

First, the allocating unit 112f creates a list of the heat pump systems 40 in which the heat pump systems 40 are arranged in descending order of the gain "a" of the response curves and in ascending order of the value of the coefficient "b" of the response curves. That is, the allocating unit 112f arranges the heat pump systems 40 retained by consumers in the order of cooperating the request to adjust energy consumption with little reward.

Next, the allocating unit 112f allocates the adjustment amounts and the monetary rewards to the heat pump systems 40 in order from the top of the list.

In a case where the monetary reward corresponding to the coefficient "b" of the response curve of that heat pump system 40 is equal to or less than the allocatable monetary reward and the adjustment amount corresponding to that monetary reward is equal to or less than the allocatable adjustment amount, the allocating unit 112f allocates that adjustment amount and monetary reward to that heat pump system 40. If this is not the case, the allocating unit 122f allocates all the allocatable adjustment amount and monetary reward to that heat pump system 40. The allocating unit 112f subtracts the allocated adjustment amount and monetary reward from the allocatable adjustment amount and monetary reward, respectively.

If an allocatable adjustment amount remains, the allocating unit 112f allocates the adjustment amount and the monetary reward in the same way as above to the heat pump system 40 next in order on the list.

The allocating unit 112f repeats the above processing until all the allocatable adjustment amounts are allocated.

At an initial stage where data such as the actual values of energy consumption have not yet been accumulated to the extent that the response characteristics 125 can be extracted, the allocating unit 112f equally divides, by the number of the heat pump systems 40, the energy consumption adjustment amount needing to be allocated and the allocatable monetary reward and allocates those to each of the heat pump systems 40.

(5-3) Response Characteristic Learning Processing Flow

Figure 11:
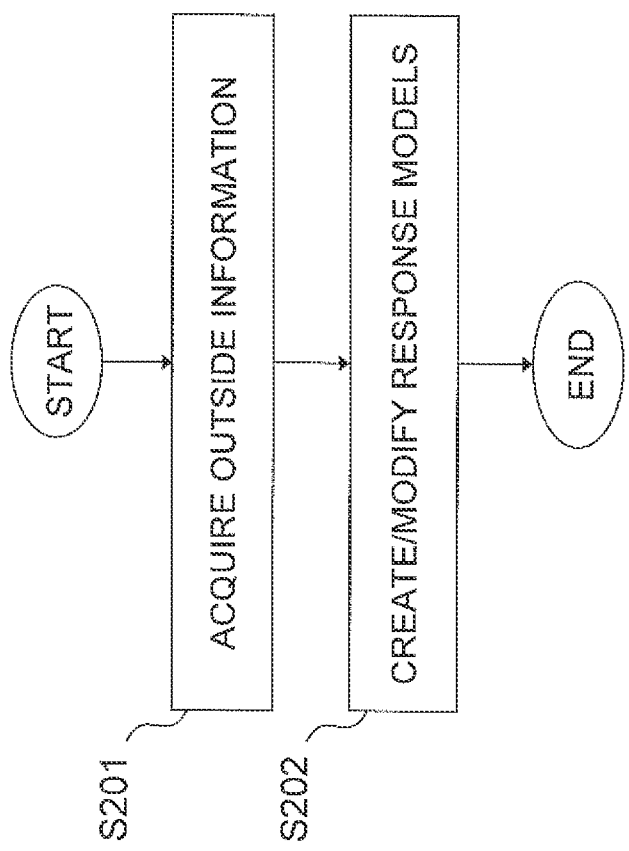
FIG. 11 is a flowchart of response characteristic learning processing.

Next, a flow of processing for learning the response characteristics will be described using the flowchart of FIG. 11.
(5-3-1) Step S201

In a step S201, the outside information 126 such as weather, temperature, and humidity is acquired. Specifically, the outside information acquiring unit 112h receives the outside information 126 from the server of a business operator offering the service of providing weather data via the communication network 81 such as the Internet. The outside information 126 includes, for example, information relating to weather, temperature, and humidity by time period (e.g., every 1 minute). The received outside information 126 is accumulated in the database 113a.
(5-3-2) Step S202

In a step S202, the learning unit 112g analyzes the individual consumption plans 121, the individual consumption requests 124, the outside information 126, and the operation data 103a and uses machine learning to extract the response characteristics 125. The learning unit 112g stores the response models 125 via the DBMS in the database 113a. The existing response models 125 stored in the database 113a are updated with the newly created response models 125.

Specifically, for example, the learning unit 112g analyzes the requested values of a time period included in the individual consumption requests 124, the planned values and the actual values of energy consumption of the same time period included in the individual consumption plans 121, and the operation data 103a of the same time period and calculates the actual values of the energy consumption adjustment amounts of each of the heat pump systems 40 by time period. By comparing the requested values in the individual consumption requests 124 and the actual values of energy consumption in the individual consumption plans 121, it is known whether or not each of the heat pump systems 40 adjusted its energy consumption. Furthermore, by referring to the operation data 103a, it is known, for example, whether or not a user, while the heat pump system 40 is being controlled in accordance with the requested values in the individual consumption request 124, cancelled that control with an interrupt operation. The adjustment amount in a case where the heat pump system 40 adjusted its energy consumption can be calculated by comparing the planned values included in the individual consumption plan 121 that the heat pump system 40 transmitted before an adjustment was requested by the individual consumption request 124 and the actual values included in the individual consumption plan 121 after the request. The incentives that are monetary rewards or monetary penalties is known by referring to the individual consumption request 124 in the same time period.

The learning unit 112g extracts learning data in which the energy consumption adjustment amounts and monetary rewards are compared. In a case where the incentive is a monetary penalty, the learning unit 112g extracts learning data in which the energy consumption adjustment amounts and monetary penalties are compared. The extracted learning data are stored in the database 113a.

The learning data are classified by patterns, such as weekdays, weekends, time periods such as morning, daytime, and night, weather, temperature, humidity, and season. The learning unit 112g uses machine learning to extract the sigmoid function of equation 1 by patterns from the learning data. That is, the learning unit 112g plots the learning data such as shown in FIG. 12 for each of the patterns and obtains the coefficients "a", "b", and "c" of the sigmoid function of equation 1.

In a case where the obtained coefficients "a", "b", and "c" differ from the coefficients "a", "b", and "c" stored in the database 113a, the stored coefficients are updated with the newly Obtained coefficients "a", "b", and "c". That is, the response characteristics 125 existing in the database 113a are updated to the new response characteristics 125.

The above-described processing for learning the response characteristics is executed at predetermined intervals (e.g., 1 day).

(6) Characteristics (6-1)

In the above embodiment, the heat pump system energy management device 110 is a management device that manages the plural heat pump systems 40 to bring the total amount of energy consumed by the heat pump systems 40 closer to the requested value in the total consumption request 123 that is a target value. The heat pump system energy management device 110 comprises the request transmitting unit 112e, the consumption information receiving unit 112c, the database 113a, and the learning unit 112g. The request transmitting unit 112e transmits the requested values of energy consumption as the individual consumption requests 124 to each of the heat pump systems 40 (the heat pump system control devices 100). The consumption information receiving unit 112c receives the individual consumption plans 121 including the actual values of energy consumption from each of the heat pump systems 40 (the heat pump system control devices 100). The database 113a stores the response characteristics 125 of the consumers having each of the heat pump systems 40 with respect to the requested values of energy consumption. The learning unit 112g teams the response characteristics 125 and reflect the learning results based on past records of responses of each of the consumers with respect to the requested values of energy consumption in the database 113a. Consequently, the heat pump system energy management device 110 can predict how each of the heat pump systems 40 will respond to requests to adjust energy consumption. Because of this, stable supply and demand adjustments can be realized in the management device that manages the energy consumption of the heat pump systems 40 of the plural consumers.

Furthermore, fluctuations of frequency in the electric power system can be kept in a prescribed range without greatly impairing user convenience because the energy consumption adjustments are performed utilizing the heat pump systems 40 that have thermal buffers.

Furthermore, plant and equipment investment costs can be curbed compared to existing consumption adjusting means (pumped-storage hydroelectricity, rechargeable batteries, flywheels, etc.).

(6-2)

In the above embodiment, the learning unit 112g learns the response characteristics 125 by connecting the actual values of energy consumption with the outside information 126 relating to at least one of season, day of week, time period, and weather. That is, the learning unit 112g uses information such as season, day of week, time period, and weather and the past records as a base for learning the response characteristics. Because of this, highly reliable response characteristics can be obtained.

(6-3)

In the above embodiment, the response characteristics 125 are expressed as mathematical models. Because of this, highly reliable response characteristics can be obtained.

(6-4)

In the above embodiment, the request transmitting unit 112e of the heat pump system energy management device 110 transmits the individual consumption requests 124 including information relating to incentives to each of the heat pump systems 40 (the heat pump system control devices 100). Because of this, each of the consumers can be offered incentives for following the requested values included in the individual consumption requests 124.

(6-5)

In the above embodiment, the heat pump system energy management device 110 comprises the energy consumption request receiving unit 112b. The energy consumption request receiving unit 112b receives the total consumption request 123 including the requested values of energy consumption from the energy control device 90 that the electric power company, for example, has. Because of this, the heat pump system energy management device 110 can fulfill the role of an aggregator which mediates between an electric power company and consumers for stable supply and demand adjustments of energy.

(6-6)

In the above embodiment, the heat pump system energy management device 110 comprises the allocating unit 112f. The allocating unit 112f allocates the requested values of energy consumption to each of the heat pump systems 40 on the basis of the response characteristics 125. Because of this, highly reliable energy consumption adjustments can be performed.

(7) Example Modifications (7-1) Example Modification 1A

In the above embodiment, the heat pump system energy management device 110 receives the total consumption request 123 from the energy control device 90 of the electric power company and transmits the individual consumption requests 124 to the heat pump system control devices 100 of each of the heat pump systems 40. However, in another embodiment, the consumption request receiving unit 112b may receive information relating to unit energy costs by time period (e.g., every 1 minute) from the energy control device 90 of the electric power company; and the request transmitting unit 112e may transmit that information to the heat pump system control devices 100 of each of the heat pump systems 40.

(7-2) Example Modification 1B

In the above embodiment, the learning unit 112g uses machine learning to extract the response characteristics 125 of each of the heat pump systems 40 as the sigmoid function of equation 1. The allocating unit 112f uses the sigmoid function of equation 1 to allocate the energy consumption adjustment amounts and the incentives to each of the heat pump systems 40. However, in another embodiment, the response characteristics 125 of each of the heat pump systems 40 may also be represented by another function. Furthermore, the response characteristics 125 may also be extracted using, for example, Bayesian estimation, regression analysis, or principal component analysis.

(7-3) Example Modification 1C

In the above embodiment, the heat pump system control devices 100 are devices disposed in the heat pump systems 40, but in another embodiment, the heat pump system control devices 100 may also be devices independent of the heat pump systems 40.

INDUSTRIAL APPLICABILITY

The present invention can be utilized in the aggregator business, which comes between an electric power company and plural small-scale consumers having heat pump systems, aggregates the energy consumed by these consumers, and performs adjustments.

What is claimed is:

1. A system comprising:
a plurality of heat pump systems;
a plurality of CPUs, each CPU associated with one of the heat pump systems; and
a management device adapted to manage the plural heat pump systems to bring a total amount of energy consumed by the heat pump systems closer to a target value, the management device comprising:
a control unit including a processor configured to execute a stored program;
a communication interface; and
a database,
the control unit being configured to execute the stored program to
receive a total requested value of energy consumption as the target value from a higher-level energy management device via a communication network,
allocate requested energy consumption amounts and incentives to the heat pump systems based on the total requested value of energy consumption and based on response characteristics of consumers having the heat pump systems in order to satisfy the total requested value of energy consumption, each of the incentives being a monetary reward amount,
transmit individual consumption requests to each of the heat pump systems via the communication network, each of the individual consumption requests including the requested energy consumption amount and the incentive allocated to a different one of the heat pump systems,
receive actual values of energy consumption from each of the heat pump systems via the communication network, each of the actual values of energy consumption corresponding to one of the individual consumption requests, respectively, and
learn how each of the heat pump systems responds by conducting an analysis of the individual consumption requests and the actual values of energy consumption, and to update the response characteristics of the consumers to reflect results of the analysis; and
the database storing the response characteristics,
the response characteristics being correlations between the monetary reward amounts and actual amounts by which energy consumed by each of the heat pump systems was adjusted in response to the requested energy consumption amounts,
the control unit being configured to create a list of the heat pump systems arranged from a top of the list in descending order with respect to a degree to which each of the consumers has cooperated with the individual consumption requests, the degree being determined based on the response characteristic of each of the heat pump systems so that a value of the degree is larger for consumers who cooperated with the request to adjust energy consumption in return for a smaller monetary reward amount,
the control unit being configured to allocate the requested energy consumption amounts consecutively to the heat pump systems starting from the top of the list until the total requested value of energy consumption is satisfied,
the control unit being configured to transmit the allocated energy consumption amounts to the individual heat pump systems as additional individual consumption requests,
the CPUs of the heat pump systems being configured to create operation plans in response to the additional individual consumption requests and control the heat pump systems in accordance with the operation plans.

2. The system according to claim 1, wherein
the control unit is further configured to learn the response characteristics by connecting the actual values of energy consumption with information relating to at least one of season, day of week, time period, and weather.

3. The system according to claim 2, wherein
the response characteristics are mathematical models.

4. The system according to claim 2, wherein
the control unit being configured to further receive energy pricing information from the higher-level energy management device.

5. The system according to claim 1, wherein
the response characteristics are mathematical models.

6. The system according to claim 5, wherein
the control unit being configured to further receive energy pricing information from the higher-level energy management device.

7. The system according to claim 5, wherein
the mathematical model includes a sigmoid function having at least one coefficient, and
the control unit is configured to update the at least one coefficient based on the results of the analysis.

8. The system according to claim 1, wherein
the control unit being configured to further receive energy pricing information from the higher-level energy management device.

9. The system according to claim 1, wherein
the management device is an aggregator configured to be provided separately from both the higher level energy management device and the heat pump systems.

10. The system according to claim 1, wherein
the management device is an aggregator configured to mediate between an electric power company and the consumers, the higher-level energy management device being possessed by the electric power company.

11. The system according to claim 1, wherein
at an initial stage where the response characteristics have not yet been extracted, the control unit equally divides a total energy consumption adjustment amount needing to be allocated and a total allocatable monetary reward among the heat pump systems.

* * * * *